(12) United States Patent
Cho et al.

(10) Patent No.: US 11,269,202 B2
(45) Date of Patent: *Mar. 8, 2022

(54) OPTICAL MODULATOR AND PACKAGE

(71) Applicant: Taiwan Semiconductor Manufacturing Company, Ltd., Hsinchu (TW)

(72) Inventors: Lan-Chou Cho, Hsinchu (TW);
Chewn-Pu Jou, Hsinchu (TW);
Feng-Wei Kuo, Hsinchu County (TW);
Huan-Neng Chen, Taichung (TW);
Min-Hsiang Hsu, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/094,816

(22) Filed: Nov. 11, 2020

(65) Prior Publication Data
US 2021/0063777 A1 Mar. 4, 2021

Related U.S. Application Data

(63) Continuation of application No. 16/514,993, filed on Jul. 17, 2019, now Pat. No. 10,866,440.

(51) Int. Cl.
*G02F 1/025* (2006.01)
*G02F 1/015* (2006.01)

(52) U.S. Cl.
CPC ............ *G02F 1/025* (2013.01); *G02F 1/0151* (2021.01); *G02F 2201/302* (2013.01)

(58) Field of Classification Search
None
See application file for complete search history.

(56) References Cited

U.S. PATENT DOCUMENTS

| | | | | |
|---|---|---|---|---|
| 10,866,440 B1* | 12/2020 | Cho | ......................... | G02F 1/025 |
| 2020/0124883 A1* | 4/2020 | Delisle-Simard | ....... | G02F 1/025 |

* cited by examiner

*Primary Examiner* — Michael Stahl
(74) *Attorney, Agent, or Firm* — JCIPRNET

(57) ABSTRACT

An optical modulator includes a dielectric layer and a waveguide. The waveguide is disposed on the dielectric layer. The waveguide includes an electrical coupling portion, a slab portion, and an optical coupling portion. The slab portion is sandwiched between the electrical coupling portion and the optical coupling portion. The slab portion has at least two sub-portions having different heights. A maximum height of the slab portion is smaller than a height of the electrical coupling portion.

20 Claims, 13 Drawing Sheets

OPTICAL MODULATOR AND PACKAGE

CROSS-REFERENCE TO RELATED APPLICATION

This application is a continuation application of and claims the priority benefit of a prior application Ser. No. 16/514,993, filed on Jul. 17, 2019. The entirety of the above-mentioned patent application is hereby incorporated by reference herein and made a part of this specification.

BACKGROUND

Electrical signaling and processing have been the mainstream techniques for signal transmission and processing. Optical signaling and processing have been used in increasingly more applications in recent years, particularly due to the use of optical fiber-related applications for signal transmission. Accordingly, the devices integrating optical components and electrical components are formed for the conversion between optical signals and electrical signals, as well as the processing of optical signals and electrical signals.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
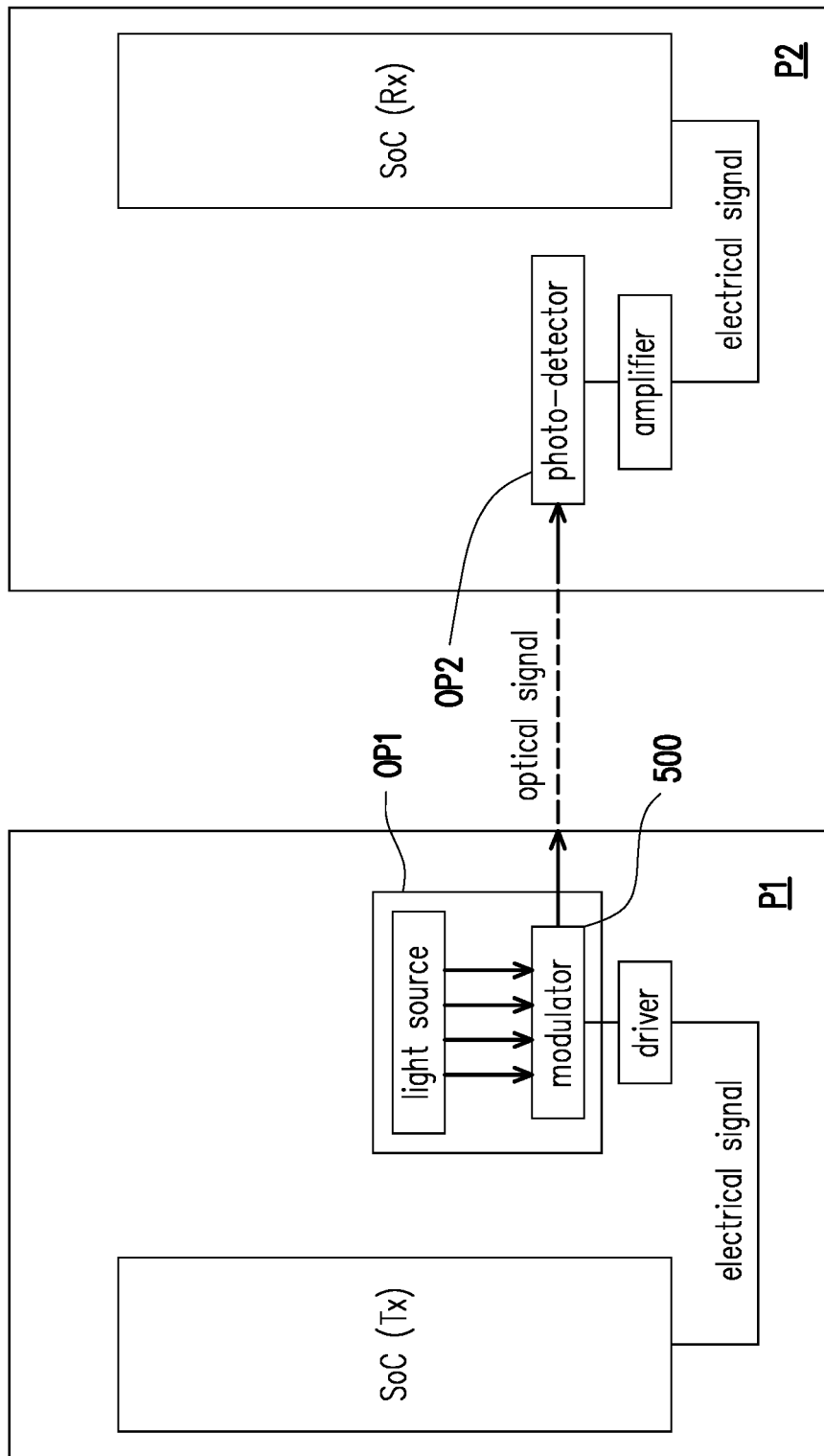
FIG. 1 is a schematic diagram illustrating optical communication in an electronic device 10 in accordance with some embodiments of the disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a schematic diagram illustrating optical communication in an electronic device 10 in accordance with some embodiments of the disclosure. Referring to FIG. 1, the electronic device 10 includes a package P1 and a package P2. In some embodiments, the package P1 and the package P2 are optically communicated with each other through an optical waveguide (not shown). Details regarding the optical communication between the package P1 and the package P2 are described below.

In some embodiments where the package P1 serves as a transmitter, the package P1 may include a SoC (system-on-chip) (Tx) die, a driver, and an optical signal source OP1. In some embodiments, the SoC (Tx) die is referred to as a "processor." In some embodiments, the driver is electrically connected to the processor (SoC (Tx) die) and is configured to drive the optical modulator 500 of the optical signal source OP1. In some embodiments, the optical signal source OP1 may include a light source (e.g., a VCSEL diode) and an optical modulator 500. In some embodiments where the package P2 serves as a receiver, the package P2 may include a SoC (Rx) die, an amplifier, and a photo-detector OP2. During the optical communication between the package P1 and the package P2, the SoC (Tx) die generates and transmits an electrical signal to the driver. Meanwhile, the driver controls the optical modulator 500 in the optical signal source OP1 based on the electrical signal generated from the SoC (Tx) dies of the package P1 such that the light beam emitted from the light source and irradiated onto the optical modulator 500 can be modulated to generate an optical signal. The optical signal generated by the optical modulator 500 is transmitted to and received by the photo-detector OP2 of the package P2. Subsequently, the photo-detector OP2 converts the optical signal into a photo-current (another electrical signal) and the photo-current is amplified by the amplifier. The amplified electrical signal is then transmitted to the SoC (Rx) die of the package P2. The configuration of the package P1 will be described in detail below.

Figure 2:
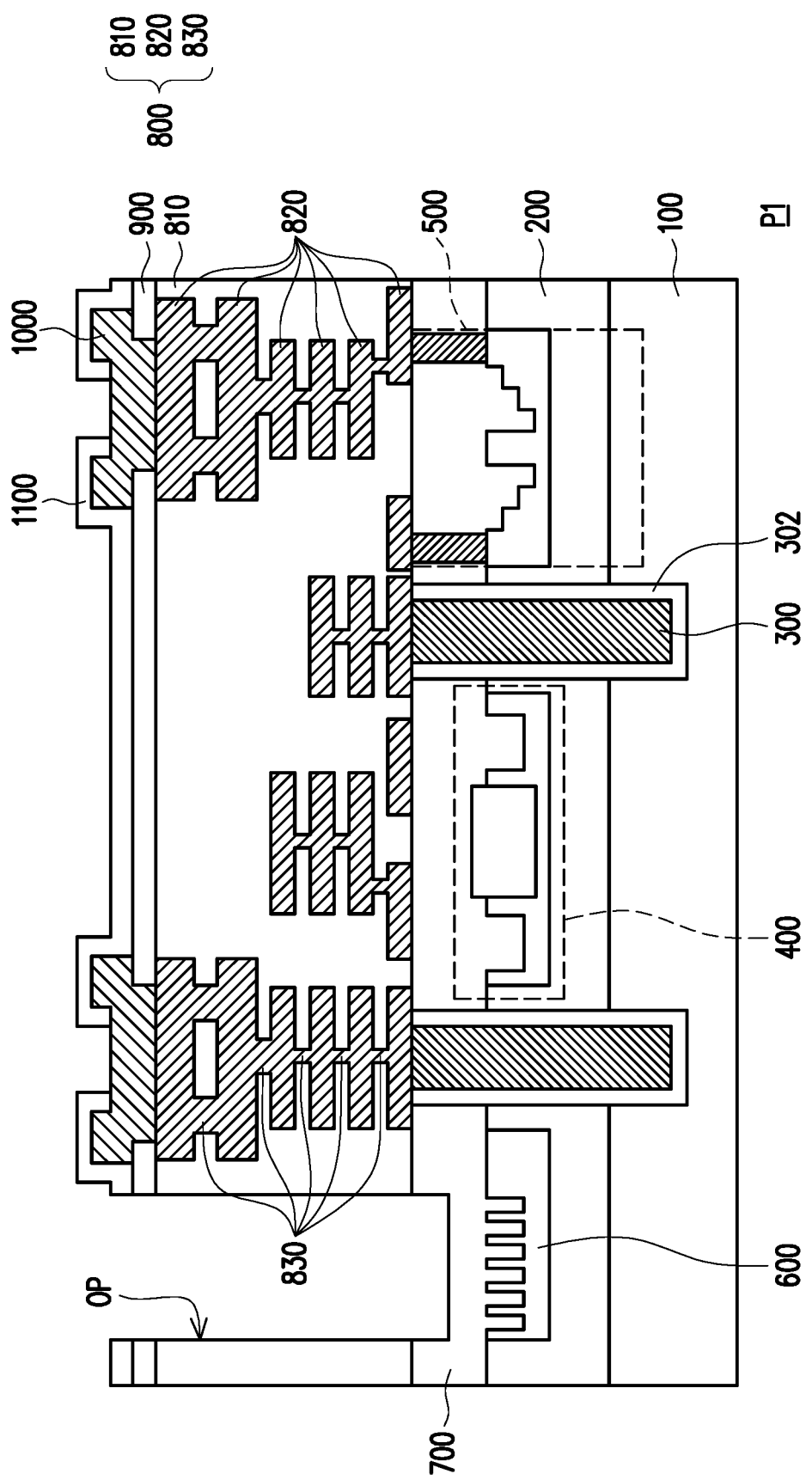
FIG. 2 is a schematic cross-sectional view illustrating the package in FIG. 1.

FIG. 2 is a schematic cross-sectional view illustrating the package P1 in FIG. 1. For simplicity, the light source in FIG. 1 is not shown in FIG. 2. Referring to FIG. 2, the package P1 includes a substrate 100. In some embodiments, the substrate 100 may be a silicon substrate, a silicon germanium substrate, or a substrate formed of other semiconductor materials. In some embodiments, the substrate 100 may be doped with p-type dopants (such as boron or $BF_2$), n-type dopants (such as phosphorus or arsenic), or a combination thereof. Alternatively, the substrate 100 may be an intrinsic semiconductor substrate. In some alternative embodiments, the substrate 100 is a dielectric substrate formed of, for example, silicon oxide. In some embodiments, the package P1 includes a dielectric layer 200 and an insulating layer 700 sequentially stacked on the substrate 100. In some embodiments, a material of the dielectric layer 200 includes silicon oxide, silicon nitride, titanium oxide, or the like. In some embodiments, the dielectric layer 200 may include a plurality of air gaps. In some embodiments, the insulating layer 700 is formed of a light-transparent material, such as silicon oxide. Although the dielectric layer 200 and the insulating layer 700 are respectively shown as a bulky layer in FIG. 2, it is understood that the dielectric layer 200 and the insulating layer 700 may be respectively constituted by multiple dielectric layers. In some embodiments, the dielectric layer 200 may be referred to as "buried oxide layer."

As illustrated in FIG. 2, the package P1 further includes integrated circuit devices 400, optical modulators 500, and optical grating couplers 600 embedded in the dielectric layer 200 and the insulating layer 700. For simplicity, one integrated circuit device 400, one optical modulator 500, and one optical grating coupler 600 are shown in FIG. 2. However, it should be understood that the package P1 may include more than one integrated circuit devices 400, more than one optical modules 500, and more than one optical grating coupler 600. In some embodiments, the integrated circuit devices 400 include active devices such as transistors and or/diodes (which may include photo diodes). In some embodiments, the integrated circuit devices 400 may also include passive devices such as capacitors, resistors, or the like. In some embodiments, the SoC (Tx) die and the driver in FIG. 1 are formed by the integrated circuit devices 400.

In some embodiments, a portion of each optical modulator 500 is embedded in the dielectric layer 200 while another portion of each optical modulator 500 is embed in the insulating layer 700. In some embodiments, the optical modulators 500 are used for modulating optical signals. The configuration and the formation method of the optical modulators 500 will be discussed in detail later.

In some embodiments, the optical grating couplers 600 are embedded in the dielectric layer 200 and are covered by the insulating layer 700. As illustrated in FIG. 2, top portions of the optical grating couplers 600 have grating, so that the optical grating couplers 600 have the function of receiving light or transmitting light. In some embodiments, the optical grating couplers 600 receive the light from the overlying light source or optical signal source (not shown) and transmit the light to the optical modulator 500 through a waveguide (not shown).

As illustrated in FIG. 2, the package P1 further includes a plurality of through vias 300 embedded in the substrate 100, the dielectric layer 200, and the insulating layer 700. In some embodiments, the through vias 300 may be referred to as "through semiconductor vias" or "through silicon vias." It is worth to note that although the through vias 300 are illustrated as not penetrating through the substrate 100 in FIG. 2, the disclosure is not limited thereto. In some alternative embodiments, the through vias 300 may penetrate through the substrate 100, the dielectric layer 200, and the insulating layer 700. In some embodiments, the through vias 300 are formed of a conductive material. For example, the through vias 300 may include a metallic material, such as tungsten, copper, titanium, aluminum, nickel, alloys thereof, or the like. In some embodiments, an isolation layer 302 is formed to encircle the through vias 300. For example, the isolation layer 302 may be formed to cover sidewalls and a bottom surface of each through via 300. In some embodiments, the isolation layer 302 electrically isolates the through vias 300 from the substrate 100. For simplicity, two through vias 300 are shown in FIG. 2. However, it should be understood that the number of the through via 300 in the package P1 may be adjusted based on demand.

In some embodiments, an interconnect structure 800 is formed over the insulating layer 700. The interconnect structure 800 includes an inter-dielectric layer 810, a plurality of patterned conductive layers 820, and a plurality of conductive vias 830. For simplicity, the inter-dielectric layer 810 is illustrated as a bulky layer in FIG. 2, but it should be understood that the inter-dielectric layer 810 may be constituted by multiple dielectric layers. The patterned conductive layers 820 and the dielectric layers of the inter-dielectric layer 810 are stacked alternately. In some embodiments, the conductive vias 830 are embedded in the dielectric layers of the inter-dielectric layer 810. In some embodiments, two adjacent patterned conductive layers 820 are electrically connected to each other through conductive vias 830. In some embodiments, the interconnection structure 800 is electrically connected to the through vias 300 and the optical modulator 500. For example, the bottommost patterned conductive layer 820 is directly in contact with the through vias 300 and the optical modulator 500 to render electrical connection between the interconnect structure 800 and the through vias 300 and between the interconnect structure 800 and the optical modulator 500. Although not illustrated, it should be understood that the integrated circuit devices 400 may be electrically connected to the interconnect structure 800 through conductive layers not shown in FIG. 2.

In some embodiments, the inter-dielectric layer 810 may be formed of silicon oxide, silicon oxynitride, silicon nitride, or low-k dielectric materials having k values lower than about 3.0. The low-k dielectric materials may include Black Diamond (a registered trademark of Applied Materials), a carbon-containing low-k dielectric material, Hydrogen SilsesQuioxane (HSQ), MethylSilsesQuioxane (MSQ), or the like. Etch stop layers (not shown) may be formed to separate neighboring dielectric layers within the inter-dielectric layer 810. In some embodiments, the etch stop layers are formed of a material having a high etching selectivity relative to the dielectric layers of the inter-dielectric layer 810. For example, the etch stop layers may be formed of silicon carbide, silicon carbo-nitride, or the like. The inter-dielectric layer 810, for example, may be formed by suitable fabrication techniques such as spin-on coating, chemical vapor deposition (CVD), plasma-enhanced chemical vapor deposition (PECVD), or the like. In some embodiments, a material of the patterned conductive layers 820 and a material of the conductive vias 830 include aluminum, titanium, copper, nickel, tungsten, and/or alloys thereof. The patterned conductive layers 820 and the conductive vias 830 may be formed by, for example, electroplating, deposition, and/or photolithography and etching. In some embodiments, the patterned conductive layers 820 and the underlying conductive vias 830 are simultaneously formed. It should be noted that the number of the dielectric layers in the inter-dielectric layer 810, the number of the patterned conductive layers 820, and the number of the conductive vias 830 shown in FIG. 2 are merely exemplary illustrations, and the disclosure is not limited. In some alternative embodiments, the number of the dielectric layers in the inter-dielectric layer 810, the number of the patterned conductive layers 820, and the number of the conductive vias 830 may be adjusted depending on the routing requirements.

As illustrated in FIG. 2, a dielectric layer 900, a plurality of conductive pads 1000, and a passivation layer 1100 are sequentially formed over the interconnect structure 800. In some embodiments, the dielectric layer 900 is formed on the interconnect structure 800 to partially cover the topmost patterned conductive layer 820. For example, the dielectric layer 900 may include a plurality of openings exposing least a portion of the topmost patterned conductive layer 820. In some embodiments, a material of the dielectric layer 900 may be similar to that of the inter-dielectric layer 810. For example, the dielectric layer 900 may be formed of silicon oxide, silicon oxynitride, silicon nitride, or low-k dielectric materials having k values lower than about 3.0.

In some embodiments, the conductive pads 1000 are formed over the dielectric layer 900 and the interconnect structure 800. In some embodiments, the conductive pads 1000 extend into the openings of the dielectric layer 900 to be directly in contact with the topmost patterned conductive layer 820. In other words, the conductive pads 1000 are electrically connected to the interconnect structure 800. In some embodiments, a material of the conductive pads 1000 may be similar to that of the patterned conductive layers 820. For example, the conductive pads 1000 may include aluminum, titanium, copper, nickel, tungsten, and/or alloys thereof. In some embodiments, the conductive pads 1000 are electrically connected to the through vias 300, the integrated circuit devices 400, and/or the optical modulators 500 through the patterned conductive layers 820 in the interconnect structure 800.

In some embodiments, the passivation layer 1100 is formed to cover the dielectric layer 900 and the conductive pads 1000. In some embodiments, the passivation layer 1100 has a plurality of openings partially exposing each conductive pad 1000 for future electrical connection. In some embodiments, the passivation layer 1100 includes, for example, polyimide, epoxy resin, acrylic resin, phenol resin, benzocyclobutene (BCB), polybenzoxazole (PBO), or other suitable polymer-based dielectric materials. In some embodiments, the passivation layer 1100 may be formed by suitable fabrication techniques such as spin-on coating, CVD, PECVD, or the like.

As illustrated in FIG. 2, openings OP are formed in the package P1. For simplicity, one opening OP is shown in FIG. 2. However, it should be understood that the package P1 may include more than one openings OP. In some embodiments, the openings OP penetrate through the passivation layer 1100, the dielectric layer 900, and the inter-dielectric layer 810. In some embodiments, the openings OP further extend into a portion of the insulating layer 700. In some embodiments, the openings OP may be formed by removing a portion of the passive layer 1100, a portion of the dielectric layer 900, a portion of the inter-dielectric layer 810, and a portion of the insulating layer 700 through a photolithography process and an etching process. In some embodiments, locations of the openings OP correspond to locations of the optical grating couplers 600. For example, the openings OP overlap the underlying optical grating couplers 600. As such, the number of the openings OP may correspond to the number of the optical grating couplers 600. In some embodiments, top views of the openings OP may take shapes of polygons, circles, or the like. In some embodiments, when the inter-dielectric layer 810 and the dielectric layer 900 include low-k dielectric materials, the openings OP may be passivated by covering sidewalls of openings OP with a conformal non-low-k dielectric layer (not shown) so that the low-k dielectric materials are not exposed. In some embodiments, the light emitted from the light source (not shown) may transmit through the openings OP and the dielectric layer 700 located directly above the optical grating couplers 600 to arrive at the optical grating couplers 600.

It is appreciated that the package P1 may include various other devices and circuits not shown in FIG. 2. These devices and circuits may be used for processing and transmitting optical signals and electrical signals.

In some embodiments, the configuration of the optical modulator 500 contributes to the performance of the electronic device 10 greatly. The details regarding the optical modulator 500 will be discussed below.

Figure 3A:
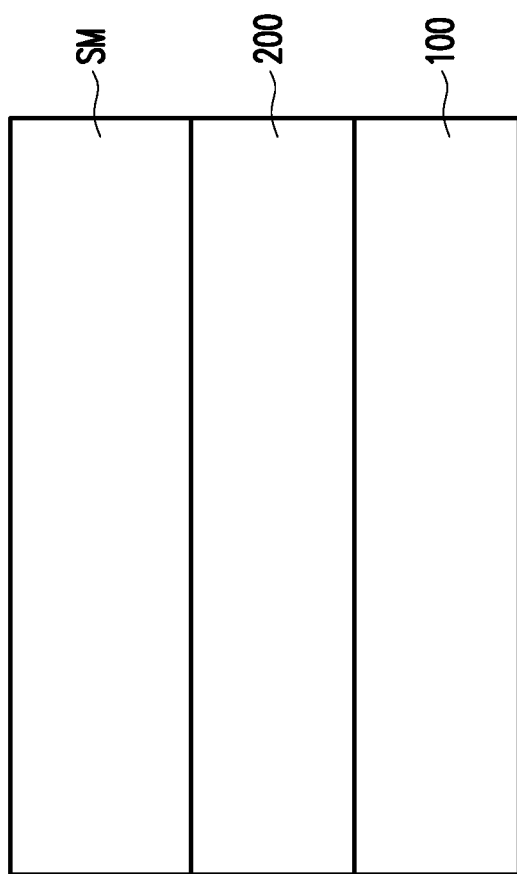
FIG. 3A to FIG. 3D are schematic cross-sectional view illustrating a manufacturing method of the optical modulator in the package of FIG. 2.

FIG. 3A to FIG. 3D are schematic cross-sectional view illustrating a manufacturing method of the optical modulator 500 in the package P1 of FIG. 2. Referring to FIG. 3A, the substrate 100 is provided. As mentioned above, the substrate 100 may be a silicon substrate, a silicon germanium substrate, or a substrate formed of other semiconductor materials. In some embodiments, the substrate 100 may be doped with p-type dopants (such as boron or $BF_2$), n-type dopants (such as phosphorus or arsenic), or a combination thereof. Alternatively, the substrate 100 may be an intrinsic semiconductor substrate. In some alternative embodiments, the substrate 100 is a dielectric substrate formed of, for example, silicon oxide.

In some embodiments, the dielectric layer 200 is formed on the substrate 100. As mentioned above, the dielectric layer 200 includes silicon oxide, silicon nitride, titanium oxide, or the like. In some alternative embodiments, when the dielectric layer 200 shown in FIG. 2 includes air gaps, the air gaps may be located within the optical modulator 500. That is, the portion of the dielectric layer 200 shown in FIG. 3A may correspond to the air gap, and the material of the dielectric layer 200 shown in FIG. 3A may be air.

As illustrated in FIG. 3A, a semiconductor material SM is formed on the dielectric layer 200. In some embodiments, a material of the semiconductor material SM and the material of the substrate 100 may be the same or may be different from each other. For example, the semiconductor material SM may be made of a suitable elemental semiconductor, such as crystalline silicon, diamond, or germanium; a suitable compound semiconductor, such as gallium arsenide, silicon carbide, indium arsenide, or indium phosphide; or a suitable alloy semiconductor, such as silicon germanium carbide, gallium arsenic phosphide, or gallium indium phosphide. In some embodiments, the structure shown in FIG. 3A may be collectively referred to as a "silicon-on-insulator (SOI) substrate."

Figure 3B:
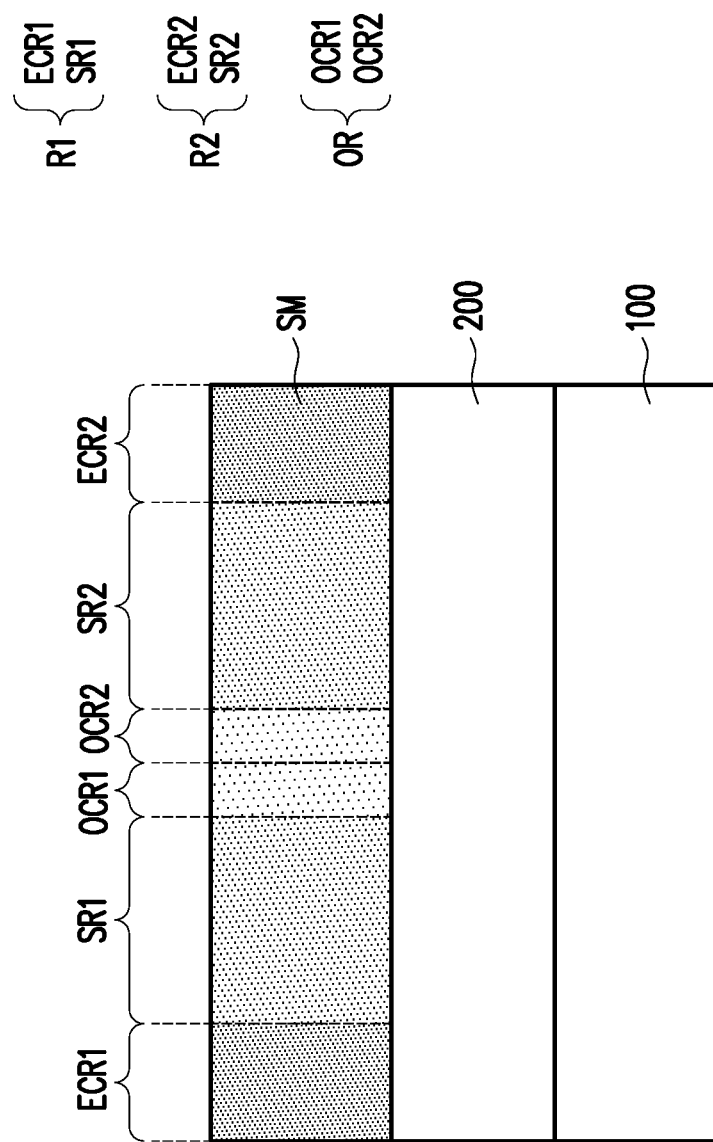

Referring to FIG. 3B, the semiconductor material SM is doped to form various regions. For example, the semiconductor material SM may be doped to form a first region R1, a second region R2, and an optical coupling region OR sandwiched between the first region R1 and the second region R2. The first region R1 may be further divided into a first electrical coupling region ECR1 and a first slab region SR1 arranged side by side. Similarly, the second region R2 may be further divided into a second electrical coupling region ECR2 and a second slab region SR2 arranged side by side. On the other hand, the optical coupling region OR may be divided into a first optical coupling region OCR1 and a second optical coupling region OCR2 arranged side by side. As illustrated in FIG. 3B, the first slab region SR1 is sandwiched between the first electrical coupling region ECR1 and the first optical coupling region OCR1. On the other hand, the second slab region SR2 is sandwiched between the second electrical coupling region ECR2 and the second optical coupling region OCR2.

In some embodiments, the semiconductor material SM located in the first electrical coupling region ECR1, the first slab region SR1, and the first optical coupling region OCR1 may be doped with dopants of first conductivity type. Meanwhile, the semiconductor material SM located in the second electrical coupling region ECR2, the second slab region SR2, and the second optical coupling region OCR2 may be doped with dopants of second conductivity type. In some embodiments, the first conductivity type is opposite to the second conductivity type. For example, the dopants of first conductivity type may be p-type dopants and the dopants of the second conductivity type may be n-type dopants. That is, in some embodiments, the semiconductor material SM located in the first electrical coupling region ECR1, the first slab region SR1, and the first optical coupling region OCR1 is doped with p-type dopants while the semiconductor material SM located in the second electrical coupling region ECR2, the second slab region SR2, and the second optical coupling region OCR2 is doped with n-type dopants. In some embodiments, the p-type dopants includes, for example, boron, $BF_2$, or the like. On the other hand, the n-type dopants includes, for example, phosphorus, arsenic, or the like.

In some embodiments, the doping concentration in each region of the semiconductor material SM varies. In some embodiments, a doping concentration in the first electrical coupling region ECR1 is greater than a doping concentration in the first slab region SR1 and the doping concentration in the first slab region SR1 is greater than a doping concentration in the first optical coupling region OCR1. Similarly, a doping concentration in the second electrical coupling region ECR2 is greater than a doping concentration in the second slab region SR2 and the doping concentration in the second slab region SR2 is greater than a doping concentration in the second optical coupling region OCR2. For example, the doping concentration in the first electrical coupling region ECR1 ranges between $1 \times 10^{20}$ cm$^{-3}$ and $1 \times 10^{22}$ cm$^{-3}$, the doping concentration in the first slab region SR1 ranges between $1 \times 10^{18}$ cm$^{-3}$ and $1 \times 10^{20}$ cm$^{-3}$, and the doping concentration in the first optical coupling region OCR1 ranges between $1 \times 10^{17}$ cm$^{-3}$ and $1 \times 10^{18}$ cm$^{-3}$. Similarly, the doping concentration in the second electrical coupling region ECR2 ranges between $1 \times 10^{20}$ cm$^{-3}$ and $1 \times 10^{22}$ cm$^{-3}$, the doping concentration in the second slab region SR2 ranges between $1 \times 10^{18}$ cm$^{-3}$ and $1 \times 10^{20}$ cm$^{-3}$, and the doping concentration in the second optical coupling region OCR2 ranges between $1 \times 10^{17}$ cm$^{-3}$ and $1 \times 10^{18}$ cm$^{-3}$.

In some embodiments, the semiconductor material SM may be doped by the following step. First, a first photoresist layer (not shown) is formed to cover the first slab region SR1, the first optical coupling region OCR1, the second optical coupling region OCR2, the second slab region SR2, and the second electrical coupling region ECR2. Meanwhile, the first photoresist layer exposes the first electrical coupling region ECR1 of the semiconductor material SM. Subsequently, an ion implantation process is performed on the revealed portion of the semiconductor material SM (the first electrical coupling region ECR1) to dope the semiconductor material SM with dopants of first concentration. Thereafter, the first photoresist layer is removed. Then, a second photoresist layer (not shown) is formed to cover the doped first electrical coupling region ECR1, the first optical coupling region OCR1, the second optical coupling region OCR2, the second slab region SR2, and the second electrical coupling region ECR2. Meanwhile, the second photoresist layer exposes the first slab region SR1 of the semiconductor material SM. Subsequently, another ion implantation process is performed on the revealed portion of the semiconductor material SM (the first slab region SR1) to dope the semiconductor material SM with dopants of second concentration. The second concentration is different from the first concentration. Thereafter, the second photoresist layer is removed. The foregoing steps may be repeated several times to obtain the semiconductor material SM having different doping concentrations/dopant types in the first electrical coupling region ECR1, the first slab region SR1, the first optical coupling region OCR1, the second optical coupling region OCR2, the second slab region SR2, and the second electrical coupling region ECR2.

Figure 3C:
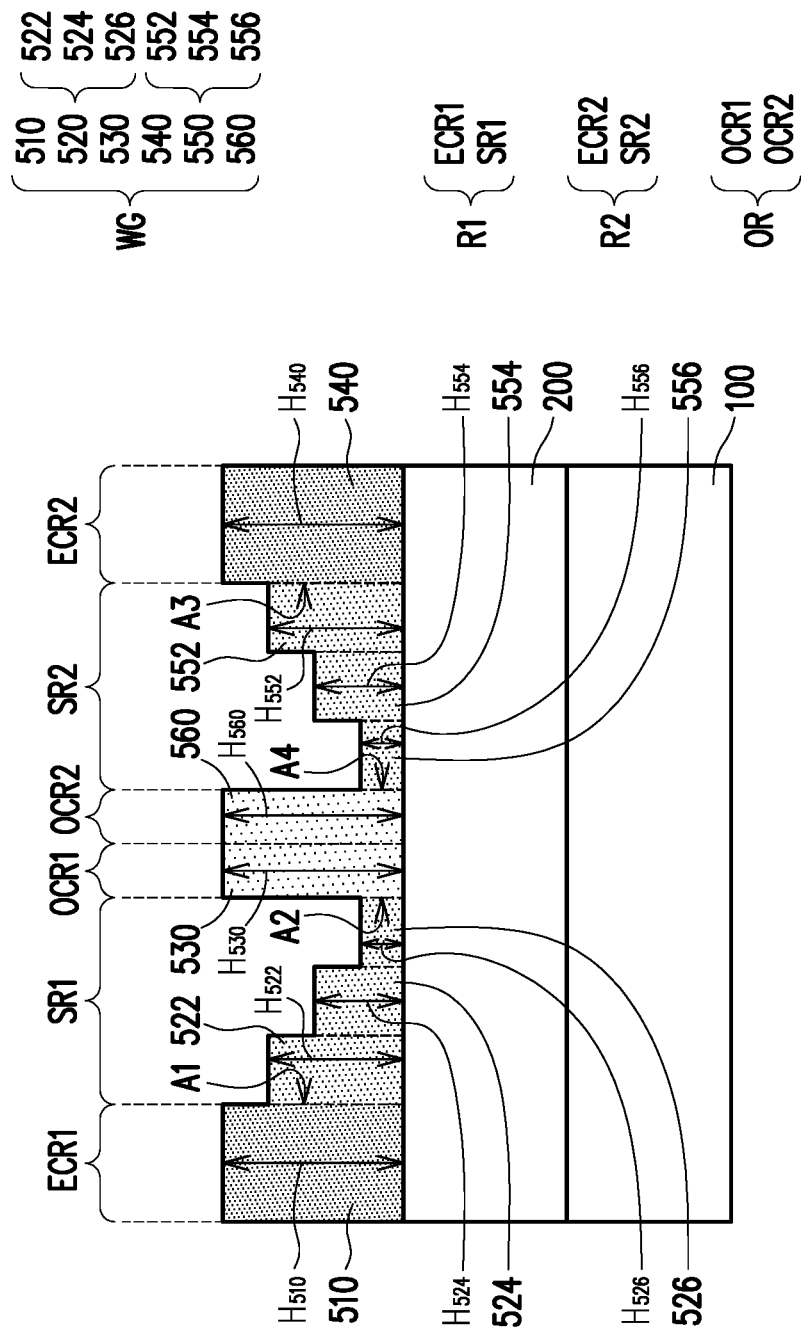

Referring to FIG. 3B and FIG. 3C, portions of the semiconductor material SM located in the first slab region SR1 and the second slab region SR2 are removed to obtain a waveguide WG disposed on the dielectric layer 200. In some embodiments, the waveguide WG has the first region R1, the second region R2, and the optical coupling region OR between the first region R1 and the second region R2. In some embodiments, the waveguide WG is divided into a first electrical coupling portion 510, a first slab portion 520, a first optical coupling portion 530, a second electrical coupling portion 540, a second slab portion 550, and a second optical coupling portion 560. In some embodiments, the first electrical coupling portion 510 is located in the first electrical coupling region ECR1, the first slab portion 520 is located in the first slab region SR1, the first optical coupling portion 530 is located in the first optical coupling region OCR1, the second electrical coupling region 540 is located in the second electrical coupling region ECR2, the second slab portion 550 is located in the second slab region SR2, and the second optical coupling portion 560 is located in the second optical coupling region OCR2. In some embodiments, the first electrical coupling portion 510 is connected to the first slab portion 520, the first slab portion 520 is connected to the first optical coupling portion 530, the first optical coupling portion 530 is connected to the second optical coupling portion 560, the second optical coupling portion 560 is connected to the second slab portion 550, and the second slab portion 550 is connected to the second electrical coupling portion 540.

In some embodiments, a height $H_{510}$ of the first electrical coupling portion 510, a height $H_{530}$ of the first optical coupling portion 530, a height $H_{540}$ of the second electrical coupling portion 540, and a height $H_{560}$ of the second optical coupling portion 560 may be substantially the same. On the other hand, a maximum height of the first slab portion 520 and a maximum height of the second slab portion 550 are smaller than the height $H_{510}$ of the first electrical coupling portion 510, the height $H_{530}$ of the first optical coupling portion 530, the height $H_{540}$ of the second electrical coupling portion 540, and the height $H_{560}$ of the second optical coupling portion 560. In some embodiments, the first slab portion 520 and the second slab portion 550 may respectively include at least two sub-portions having different heights. In other words, an interfacial area A1 between the first electrical coupling portion 510 and the first slab portion 520 is larger than an interfacial area A2 between the first slab portion 520 and the first optical coupling portion 530. Similarly, an interfacial area A3 between the second electrical coupling portion 540 and the second slab portion 550 is larger than an interfacial area A4 between the second slab portion 550 and the second optical coupling portion 560.

As illustrated in FIG. 3C, the first slab portion 520 is divided into a first sub-portion 522, a second sub-portion 524, and a third sub-portion 526. The first sub-portion 522 is connected to the first electrical coupling portion 510, the second sub-portion 524 is connected to the first sub-portion 522, and the third sub-portion 526 is connected to the second sub-portion 524 and the first optical coupling portion 530. On the other hand, the second slab portion 550 is divided into a fourth sub-portion 552, a fifth sub-portion 554, and a sixth sub-portion 556. The fourth sub-portion 552 is connected to the second electrical coupling portion 540, the fifth sub-portion 554 is connected to the fourth sub-portion 552, and the sixth sub-portion 556 is connected to the fifth sub-portion 554 and the second optical coupling portion 560.

In some embodiments, the first slab portion 520 is ladder shaped. For example, the first slab portion 520 takes the form of a staircase and has multiple steps, and each step corresponds to one sub-portion. In some embodiments, the height $H_{510}$ of the first electrical coupling portion 510 is greater than a height $H_{522}$ of the first sub-portion 522, the height $H_{522}$ of the first sub-portion 522 is greater than a height $H_{524}$ of the second sub-portion 524, and the height $H_{524}$ of the second sub-portion 524 is greater than a height $H_{526}$ of the third sub-portion 526. That is, the interfacial area A1 between the first sub-portion 522 and the first electrical coupling portion 510 is greater than the interfacial area A2 between the third sub-portion 526 and the first optical coupling portion 530. Similarly, the second slab portion 550 is also ladder shaped. For example, the second slab portion 550 takes the form of a staircase and has multiple steps, and each step corresponds to one sub-portion. In some embodiments, the height $H_{540}$ of the second electrical coupling portion 540 is greater than a height $H_{552}$ of the fourth sub-portion 552, the height $H_{552}$ of the fourth sub-portion 552 is greater than a height $H_{554}$ of the fifth sub-portion 554, and the height $H_{554}$ of the fifth sub-portion 554 is greater than a height $H_{556}$ of the sixth sub-portion 556. That is, the interfacial area A3 between the fourth sub-portion 552 and the second electrical coupling portion 540 is greater than the interfacial area A4 between the sixth sub-portion 556 and the second optical coupling portion 560. It should be noted that the number of the sub-portions in the first slab portion 520 and the second slab portion 550 shown in FIG. 3C is merely an exemplary illustration, and the disclosure is not limited thereto. In some alternative embodiments, the first slab portion 520 and the second slab portion 550 may respectively include other number of sub-portions based on need.

In some embodiments, the ladder shaped first slab portion 520 and the ladder shaped second slab portion 550 may be formed by a patterning process. In some embodiments, the patterning process involves a photolithography process and an etching process. For example, a third photoresist layer is formed on the doped semiconductor material SM (shown in FIG. 3B) to cover the semiconductor material SM located in the first electrical coupling region ECR1, the semiconductor material SM located in the first optical coupling region OCR1, the semiconductor material SM located in the second optical coupling region OCR2, the semiconductor material SM located in the second slab region SR2, and the semiconductor material SM located in the second electrical coupling region ECR2. The third photoresist layer also covers a portion of the semiconductor material SM located in the first slab region SR1 while exposing another portion of the semiconductor material SM located in the first slab region SR1. Subsequently, an etching process is performed on the exposed portion of the semiconductor material SM to form the first sub-portion 522 in the first slab region SR1. Thereafter, the third photoresist layer is removed. Then, a fourth photoresist layer is formed on the doped semiconductor material SM (shown in FIG. 3B) to cover the semiconductor material SM located in the first electrical coupling region ECR1, the semiconductor material SM located in the first optical coupling region OCR1, the semiconductor material SM located in the second optical coupling region OCR2, the semiconductor material SM located in the second slab region SR2, and the semiconductor material SM located in the second electrical coupling region ECR2. The fourth photoresist layer also covers the first sub-portion 522 and a portion of the remaining semiconductor material SM located in the first slab region SR1. Meanwhile, the fourth photoresist layer exposes another portion of the remaining semiconductor material SM located in the first slab region SR1. Subsequently, an etching process is performed on the exposed portion of the semiconductor material SM to form the second sub-portion 524 in the first slab region SR1. It should be noted that the etchant recipe or etching duration may be adjusted to render the second sub-portion 524 shorter than the first sub-portion 522. Thereafter, the fourth photoresist layer is removed. The foregoing steps may be repeated several times to obtain the ladder shaped first slab portion 520 and the ladder shaped second slab portion 550.

Although FIG. 3B and FIG. 3C illustrated that the doping process precedes the patterning process, it should be understood that the disclosure is not limited thereto. In some alternative embodiments, the patterning process shown in FIG. 3C may take place before the doping process shown in FIG. 3B.

As mentioned above, the doping concentrations in various regions of the semiconductor material SM are different. As such, a doping concentration of the first electrical coupling portion 510 is greater than a doping concentration of the first slab portion 520 and the doping concentration of the first slab portion 520 is greater than a doping concentration of the first optical coupling portion 530. Similarly, a doping concentration of the second electrical coupling portion 540 is greater than a doping concentration of the second slab portion 550 and the doing concentration of the second slab portion 550 is greater than a doping concentration of the second optical coupling portion 560. For example, the doping concentration of the first electrical coupling portion 510 ranges between $1\times10^{20}$ cm$^{-3}$ and $1\times10^{22}$ cm$^{-3}$, the doping concentration of the first slab portion 520 ranges between $1\times10^{18}$ cm$^{-3}$ and $1\times10^{20}$ cm$^{-3}$, and the doping concentration of the first optical coupling portion 530 ranges between $1\times10^{17}$ cm$^{-3}$ and $1\times10^{18}$ cm$^{-3}$. Similarly, the doping concentration of the second electrical coupling portion 540 ranges between $1\times10^{20}$ cm$^{-3}$ and $1\times10^{22}$ cm$^{-3}$, the doping concentration of the second slab portion 550 ranges between $1\times10^{18}$ cm$^{-3}$ and $1\times10^{20}$ cm$^{-3}$, and the doping concentration of the second optical coupling portion 560 ranges between $1\times10^{17}$ cm$^{-3}$ and $1\times10^{18}$ cm$^{-3}$. In other words, a doping concentration gradient may be seen in the waveguide WG. In some embodiments, the first sub-portion 522, the second sub-portion 524, and the third sub-portion 526 have the same doping concentration. Similarly, the fourth sub-portion 552, the fifth sub-portion 554, and the sixth sub-portion 556 have the same doping concentration.

Figure 3D:
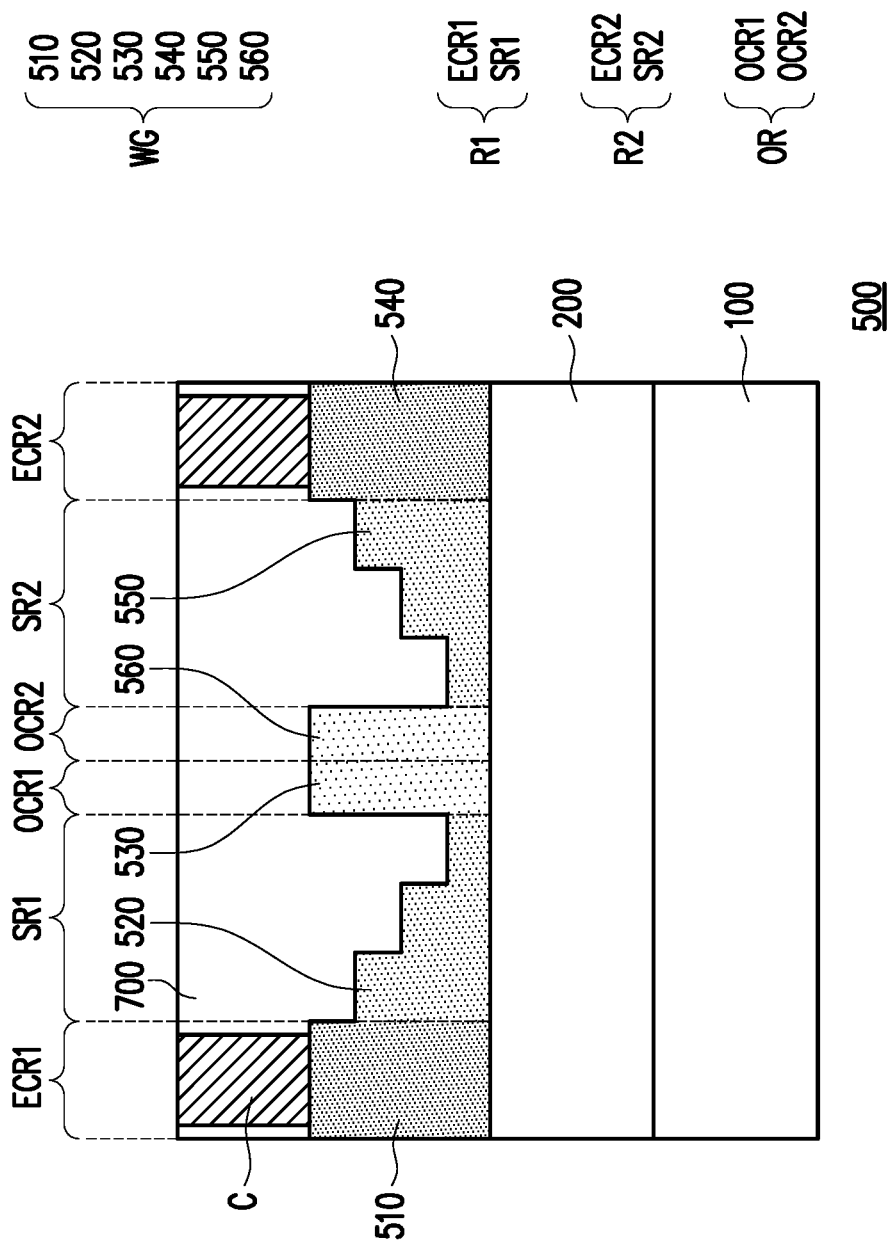

Referring to FIG. 3D, a plurality of conductive connectors C and the insulating layer 700 are sequentially formed on the waveguide WG to form the optical modulator 500. In some embodiments, the conductive connectors C are formed on the first electrical coupling portion 510 and the second electrical coupling portion 540. In some embodiments, a material of the conductive connectors C include aluminum, titanium, copper, nickel, tungsten, and/or alloys thereof. In some embodiments, the conductive connectors C are electrically connected to the interconnect structure 800 (shown in FIG. 2). For example, the conductive connectors C are directly in contact with the bottommost patterned conductive layer 820 to render electrical connection between the optical modulator 500 and the interconnect structure 800. That is, the conductive connectors C electrically connects the waveguide WG and the interconnect structure 800. As mentioned above, the insulating layer 700 is formed of a light-transparent material, such as silicon oxide. The insulating layer 700 covers the conductive connectors C and the waveguide WG. For example, the insulating layer 700 laterally covers the conductive connectors C and exposes top surfaces of the conductive connectors C for electrical connection. At this stage, the manufacturing process of the optical modulator 500 is substantially completed, and the configuration of the optical modulator 500 is shown in FIG. 4.

Figure 4:
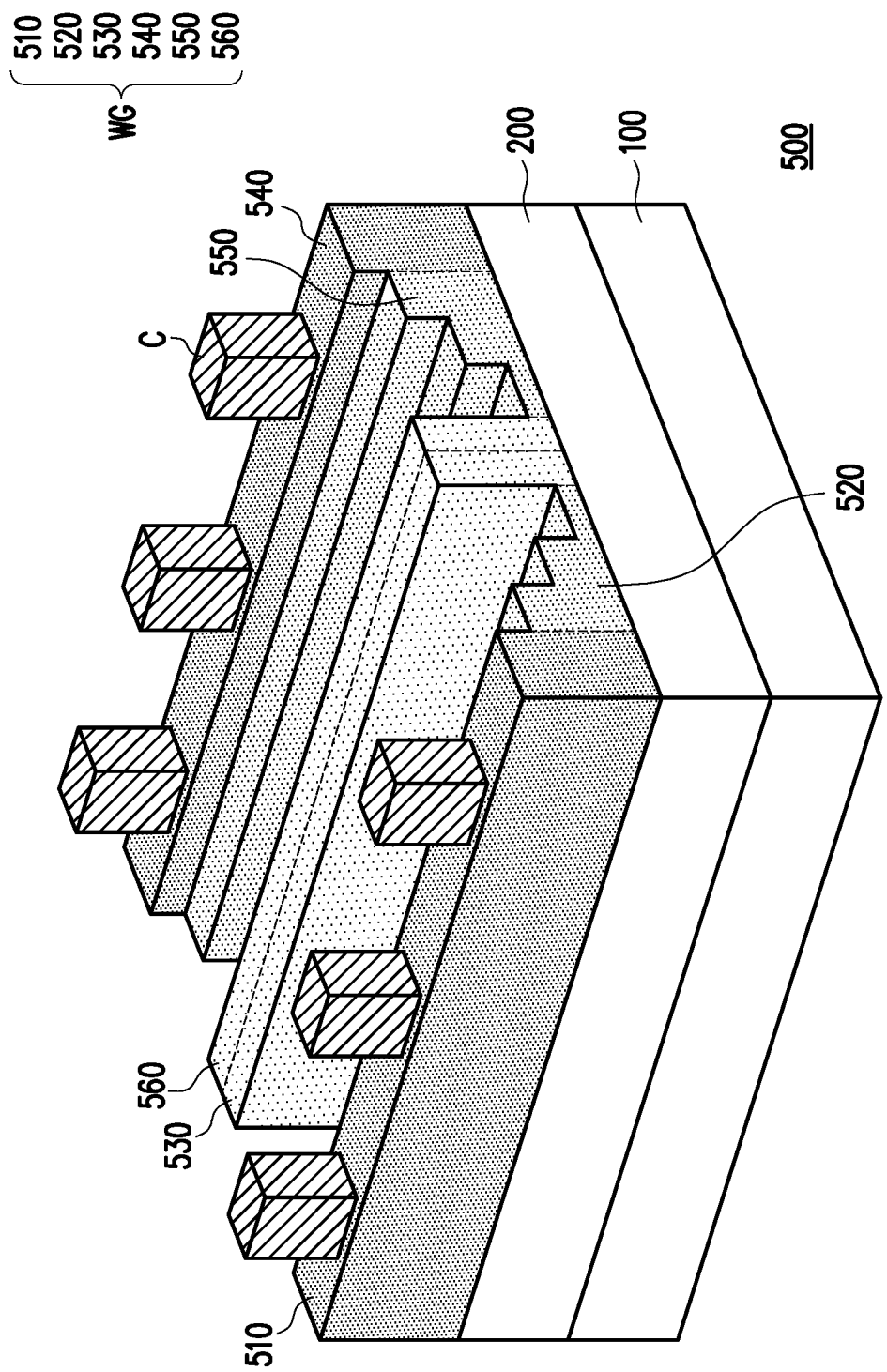
FIG. 4 is a perspective view illustrating the optical modulator in the package of FIG. 2.

FIG. 4 is a perspective view illustrating the optical modulator 500 in the package P1 of FIG. 2. For simplicity, the insulating layer 700 of the optical modulator 500 is not shown in FIG. 4. Referring to FIG. 4, the optical modulator 500 has the substrate 100, the dielectric layer 200, the waveguide WG, the conductive connectors C, and the insulating layer 700 (not shown). The dielectric layer 200 and the waveguide WG are sequentially disposed on the substrate 100. In some embodiments, the waveguide WG is divided into the first electrical coupling portion 510, the first slab portion 520, the first optical coupling portion 530, the second electrical coupling portion 540, the second slab portion 550, and the second optical coupling portion 560. In some embodiments, the first electrical coupling portion 510, the first optical coupling portion 530, the second electrical coupling portion 540, and the second optical coupling portion 560 are strips parallel to each other. On the other hand, the first slab portion 520 and the second slab portion 550 are staircases respectively sandwiched between the first electrical coupling portion 510 and the first optical coupling portion 530 and between the second electrical coupling portion 540 and the second optical coupling portion 560. In some embodiments, the strips and the staircases provide sufficient length to prevent optical loss during optical transmission.

In some embodiments, the doping concentration of the first electrical coupling portion 510 is greater than the doping concentration of the first slab portion 520 and the doping concentration of the first slab portion 520 is greater than the doping concentration of the first optical coupling portion 530. Similarly, the doping concentration of the second electrical coupling portion 540 is greater than the doping concentration of the second slab portion 550 and the doping concentration of the second slab portion 550 is greater than the doping concentration of the second optical coupling portion 560. In other words, in some embodiments, the first electrical coupling portion 510 and the second electrical coupling portion 540 may be referred to as the "heavily doped portion" while the first optical coupling portion 530 and the second optical coupling portion 560 may be referred to as the "lightly doped portion." In some embodiments, since the optical signal is transmitted close to/in the first optical coupling portion 530 and the second optical coupling portion 560, the lightly doped portions (the first optical coupling portion 530 and the second optical coupling portion 560) are able to maintain sufficient optical signal transmission. In other words, the optical loss is minimized. On the other hand, since the electrical signal is transmitted to the first electrical coupling portion 510 and the second electrical coupling portion 540, the heavily doped portions (the first electrical coupling portion 510 and the second electrical coupling portion 540) are able to increase depletion region variation under different voltage bias, thereby providing larger effective refractive index change (Δ Neff). Moreover, the ladder shaped first slab portion 520 and the ladder shaped second slab portion 550 provide sufficient thickness to reduce sheet resistance, thereby minimizing the RC delay. As such, a desired bandwidth may be effectively obtained. For example, as compared to the straight slab portions, the ladder shaped first slab portion 520 and the ladder shaped second slab portion 550 are able to reduce the transmission loss by up to 14%, to reduce the slab resistance by approximately 35%, and to improve the bandwidth by approximately 49%.

Figure 5:
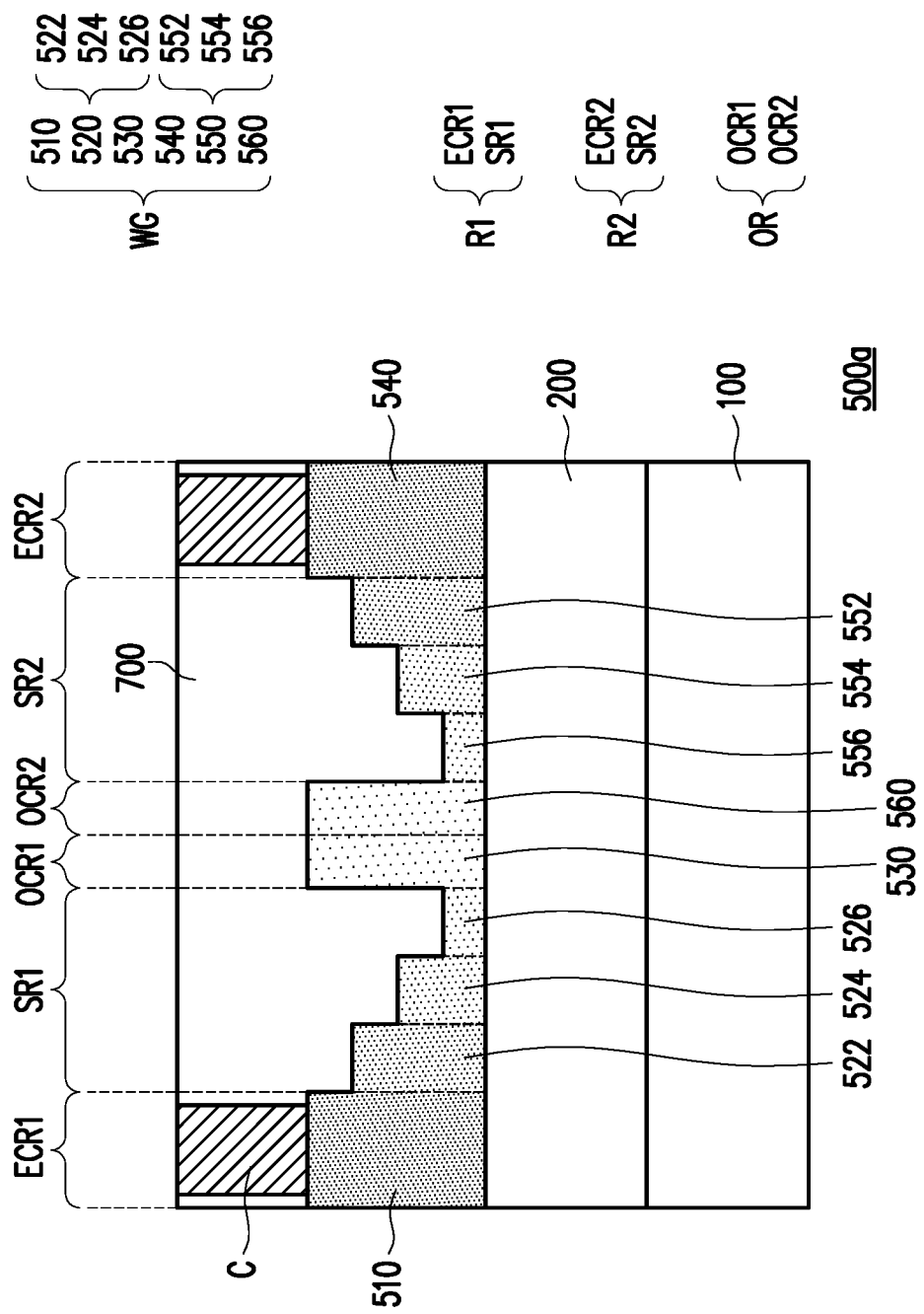
FIG. 5 is a schematic cross-sectional view illustrating an optical modulator in accordance with some alternative embodiments of the disclosure.

FIG. 5 is a schematic cross-sectional view illustrating an optical modulator 500a in accordance with some alternative embodiments of the disclosure. Referring to FIG. 5, the optical modulator 500a in FIG. 5 is similar to the optical modulator 500 in FIG. 3D, so similar elements are denoted by the same reference numeral and the detailed descriptions thereof are omitted herein. The difference between the optical modulator 500a in FIG. 5 and the optical modulator 500 in FIG. 3D lies in that the first slab portion 520 and the second slab portion 550 in the optical modulator 500a respectively has a doping concentration gradient. For example, a doping concentration of the first electrical coupling portion 510 is greater than a doping concentration of the first sub-portion 522, the doping concentration of the first sub-portion 522 is greater than a doping concentration of the second sub-portion 524, the doping concentration of the second sub-portion 524 is greater than a doping concentration of the third sub-portion 526, and the doping concentration of the third sub-portion 526 is greater than a doping concentration of the first optical coupling portion 530. Similarly, a doping concentration of the second electrical coupling portion 540 is greater than a doping concentration of the fourth sub-portion 552, the doping concentration of the fourth sub-portion 552 is greater than a doping concentration of the fifth sub-portion 554, the doping concentration of the fifth sub-portion 554 is greater than a doping concentration of the sixth sub-portion 556, and the doping concentration of the sixth sub-portion 556 is greater than a doping concentration of the second optical coupling portion 560.

In some embodiments, the doping concentration of the first electrical coupling portion 510 ranges between $1\times10^{20}$ $cm^{-3}$ and $1\times10^{22}$ $cm^{-3}$ and the doping concentration of the first optical coupling portion 530 ranges between $1\times10^{17}$ $cm^{-3}$ and $1\times10^{18}$ $cm^{-3}$. On the other hand, the doping concentration of the first sub-portion 522, the doping concentration of the second sub-portion 524, and the doping concentration of the third sub-portion 526 respectively range between $1\times10^{18}$ $cm^{-3}$ and $1\times10^{20}$ $cm^{-3}$ with a proviso that the doping concentration of the first sub-portion 522 is greater than the doping concentration of the second sub-portion 524 and the doping concentration of the second sub-portion 524 is greater than the doping concentration of the third sub-portion 526. Similarly, the doping concentration of the second electrical coupling portion 540 ranges between $1\times10^{20}$ $cm^{-3}$ and $1\times10^{22}$ $cm^{-3}$ and the doping concentration of the second optical coupling portion 560 ranges between $1\times10^{17}$ $cm^{-3}$ and $1\times10^{18}$ $cm^{-3}$. On the other hand, the doping concentration of the fourth sub-portion 552, the doping concentration of the fifth sub-portion 554, and the doping concentration of the sixth sub-portion 556 respectively range between $1\times10^{18}$ $cm^{-3}$ and $1\times10^{20}$ $cm^{-3}$ with a proviso that the doping concentration of the fourth sub-portion 552 is greater than the doping concentration of the fifth sub-portion 554 and the doping concentration of the fifth sub-portion 554 is greater than the doping concentration of the sixth sub-portion 556.

In some embodiments, since the optical signal is transmitted close to/in the first optical coupling portion 530 and the second optical coupling portion 560, the lightly doped portions (the first optical coupling portion 530 and the second optical coupling portion 560) are able to maintain sufficient optical signal transmission. In other words, the optical loss is minimized. On the other hand, since the electrical signal is transmitted to the first electrical coupling portion 510 and the second electrical coupling portion 540, the heavily doped portions (the first electrical coupling portion 510 and the second electrical coupling portion 540) are able to increase depletion region variation under different voltage bias, thereby providing larger effective refractive index change ($\Delta$ Neff). Moreover, the ladder shaped first slab portion 520 and the ladder shaped second slab portion 550 provide sufficient thickness to reduce sheet resistance, thereby minimizing the RC delay. As such, a desired bandwidth may be effectively obtained. For example, as compared to the straight slab portions, the ladder shaped first slab portion 520 and the ladder shaped second slab portion 550 are able to reduce the transmission loss by up to 14%, to reduce the slab resistance by approximately 35%, and to improve the bandwidth by approximately 49%.

Figure 6:
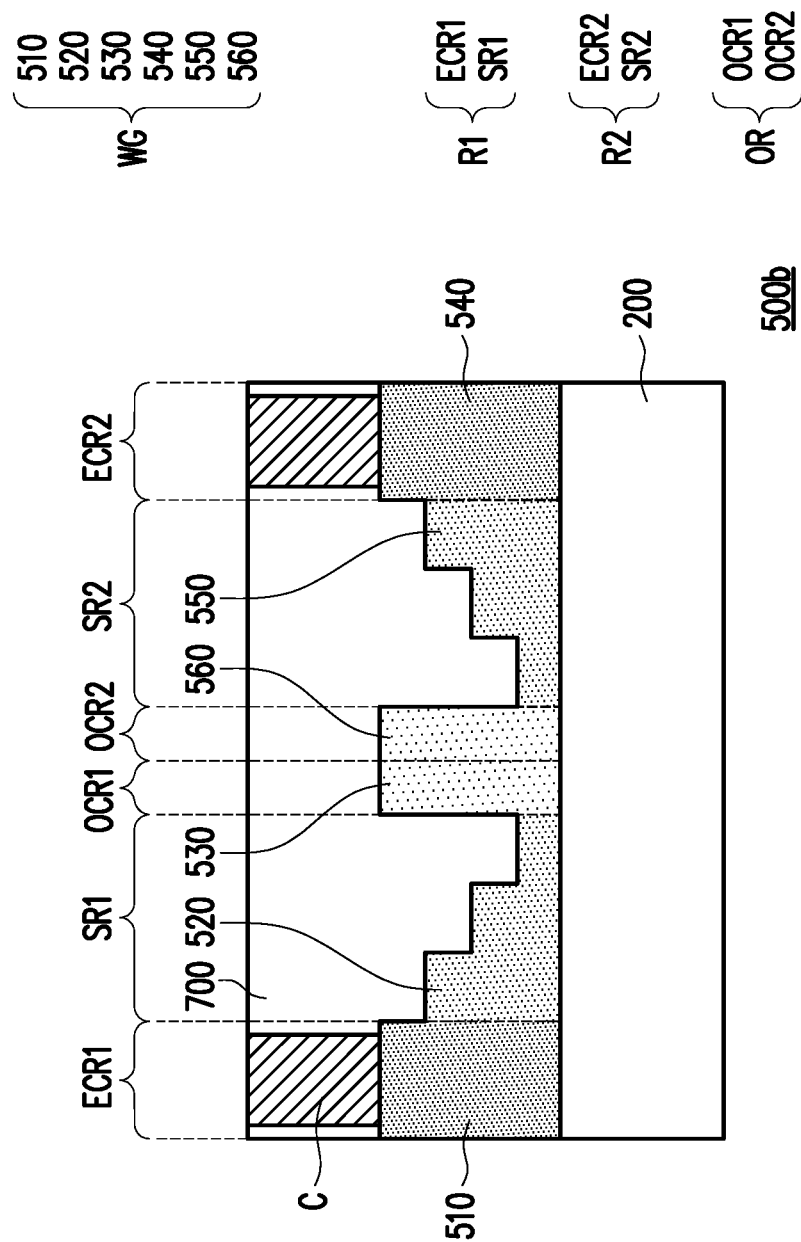
FIG. 6 is a schematic cross-sectional view illustrating an optical modulator in accordance with some alternative embodiments of the disclosure.

FIG. 6 is a schematic cross-sectional view illustrating an optical modulator 500b in accordance with some alternative embodiments of the disclosure. Referring to FIG. 6, the optical modulator 500b in FIG. 6 is similar to the optical modulator 500 in FIG. 3D, so similar elements are denoted by the same reference numeral and the detailed descriptions thereof are omitted herein. The difference between the optical modulator 500b in FIG. 6 and the optical modulator 500 in FIG. 3D lies in that the optical modulator 500b in FIG. 6 is substrate-less. In other words, the substrate 100 shown in FIG. 3D is omitted.

In some embodiments, since the optical signal is transmitted close to/in the first optical coupling portion 530 and the second optical coupling portion 560, the lightly doped portions (the first optical coupling portion 530 and the second optical coupling portion 560) are able to maintain sufficient optical signal transmission. In other words, the optical loss is minimized. On the other hand, since the electrical signal is transmitted to the first electrical coupling portion 510 and the second electrical coupling portion 540, the heavily doped portions (the first electrical coupling portion 510 and the second electrical coupling portion 540) are able to increase depletion region variation under different voltage bias, thereby providing larger effective refractive index change ($\Delta$ Neff). Moreover, the ladder shaped first slab portion 520 and the ladder shaped second slab portion 550 provide sufficient thickness to reduce sheet resistance, thereby minimizing the RC delay. As such, a desired bandwidth may be effectively obtained. For example, as compared to the straight slab portions, the ladder shaped first slab portion 520 and the ladder shaped second slab portion 550 are able to reduce the transmission loss by up to 14%, to reduce the slab resistance by approximately 35%, and to improve the bandwidth by approximately 49%. Furthermore, since the optical modulator 500b is substrate-less, the cost for the substrate may be saved and the compactness of the device may be enhanced.

Figure 7:
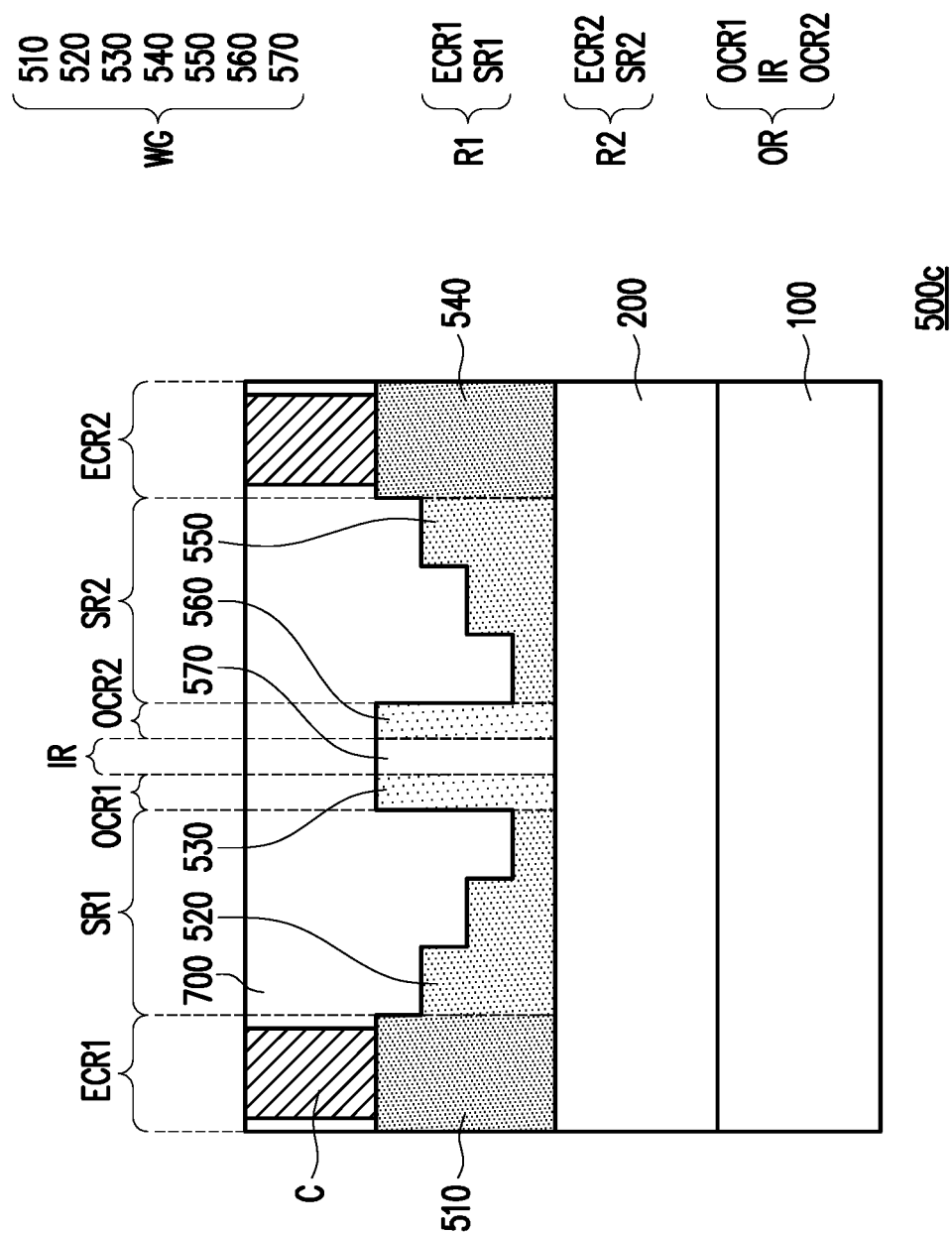
FIG. 7 is a schematic cross-sectional view illustrating an optical modulator in accordance with some alternative embodiments of the disclosure.

FIG. 7 is a schematic cross-sectional view illustrating an optical modulator 500c in accordance with some alternative embodiments of the disclosure. Referring to FIG. 7, the optical modulator 500c in FIG. 7 is similar to the optical modulator 500 in FIG. 3D, so similar elements are denoted by the same reference numeral and the detailed descriptions thereof are omitted herein. The difference between the optical modulator 500c in FIG. 7 and the optical modulator 500 in FIG. 3D lies in that the waveguide WG further includes an intrinsic semiconductor portion 570. In some embodiments, the optical coupling region OR further includes an intrinsic region IR sandwiched between the first optical coupling region OCR1 and the second optical coupling region OCR2. As illustrated in FIG. 7, the intrinsic semiconductor portion 570 is located in the intrinsic region IR. In other words, the intrinsic semiconductor portion 570 is sandwiched between the first optical coupling portion 530 and the second optical coupling portion 560. In some embodiments, the intrinsic semiconductor portion 570 is un-doped. In some embodiments, the first optical coupling portion 530 is doped with p-type dopants and the second optical coupling portion 560 is doped with n-type dopants. As such, a PIN junction/structure may be formed in the optical coupling region OR.

In some embodiments, since the optical signal is transmitted close to/in the first optical coupling portion 530 and the second optical coupling portion 560, the lightly doped portions (the first optical coupling portion 530 and the second optical coupling portion 560) are able to maintain sufficient optical signal transmission. In other words, the optical loss is minimized. On the other hand, since the electrical signal is transmitted to the first electrical coupling portion 510 and the second electrical coupling portion 540, the heavily doped portions (the first electrical coupling portion 510 and the second electrical coupling portion 540) are able to increase depletion region variation under different voltage bias, thereby providing larger effective refractive index change ($\Delta$ Neff). Moreover, the ladder shaped first slab portion 520 and the ladder shaped second slab portion 550 provide sufficient thickness to reduce sheet resistance, thereby minimizing the RC delay. As such, a desired bandwidth may be effectively obtained. For example, as compared to the straight slab portions, the ladder shaped first slab portion 520 and the ladder shaped second slab portion 550 are able to reduce the transmission loss by up to 14%, to reduce the slab resistance by approximately 35%, and to improve the bandwidth by approximately 49%. Furthermore, since a PIN junction/structure is formed in the optical coupling region OR, the power consumption in the optical modulator 500c may be lowered and the optical modulator 500c may be utilized in ultra-low power applications.

Figure 8:
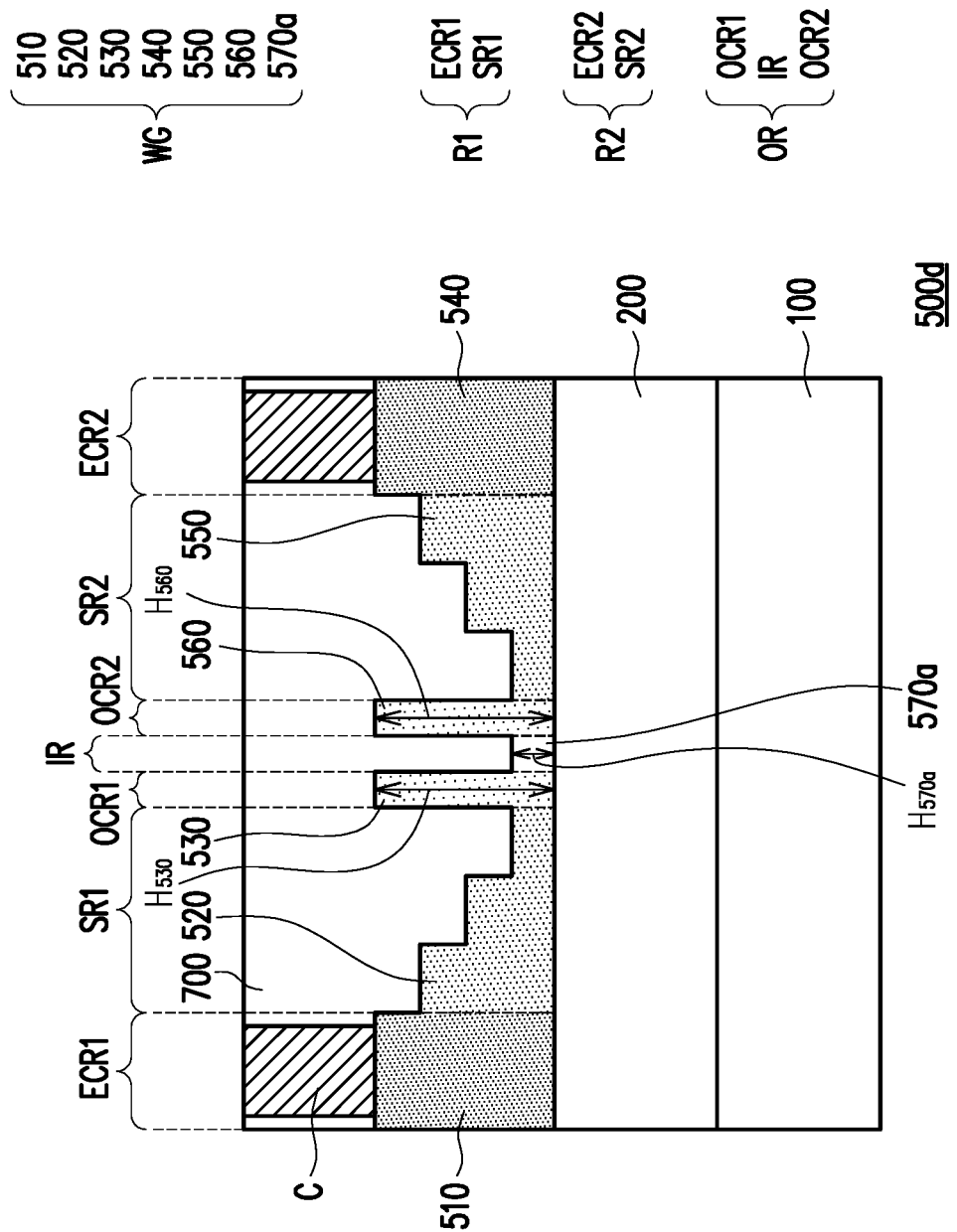
FIG. 8 is a schematic cross-sectional view illustrating an optical modulator in accordance with some alternative embodiments of the disclosure.

FIG. 8 is a schematic cross-sectional view illustrating an optical modulator 500d in accordance with some alternative embodiments of the disclosure. Referring to FIG. 8, the optical modulator 500d in FIG. 8 is similar to the optical modulator 500c in FIG. 7, so similar elements are denoted by the same reference numeral and the detailed descriptions thereof are omitted herein. The difference between the optical modulator 500d in FIG. 8 and the optical modulator 500c in FIG. 7 lies in that the waveguide WG has a recess in the optical coupling portion OR. As illustrated in FIG. 8, an intrinsic semiconductor portion 570a is located in the intrinsic region IR. In other words, the intrinsic semiconductor portion 570a is sandwiched between the first optical coupling portion 530 and the second optical coupling portion 560. In some embodiments, a height $H_{570a}$ of the intrinsic semiconductor portion 570a is smaller than the height $H_{530}$ of the first optical coupling portion 530. Similarly, the height $H_{570a}$ of the intrinsic semiconductor portion 570a is also smaller than the height $H_{560}$ of the second optical coupling portion 560. In other words, the intrinsic semiconductor portion 570a is the recessing portion of the waveguide WG. In some embodiments, the intrinsic semiconductor portion 570a is un-doped. In some embodiments, the first optical coupling portion 530 is doped with p-type dopants and the second optical coupling portion 560 is doped with n-type dopants. As such, a PIN junction/structure may be formed in the optical coupling region OR.

In some embodiments, since the optical signal is transmitted close to/in the first optical coupling portion 530 and the second optical coupling portion 560, the lightly doped portions (the first optical coupling portion 530 and the second optical coupling portion 560) are able to maintain sufficient optical signal transmission. In other words, the optical loss is minimized. On the other hand, since the electrical signal is transmitted to the first electrical coupling portion 510 and the second electrical coupling portion 540, the heavily doped portions (the first electrical coupling portion 510 and the second electrical coupling portion 540) are able to increase depletion region variation under different voltage bias, thereby providing larger effective refractive index change ($\Delta$ Neff). Moreover, the ladder shaped first slab portion 520 and the ladder shaped second slab portion 550 provide sufficient thickness to reduce sheet resistance, thereby minimizing the RC delay. As such, a desired bandwidth may be effectively obtained. For example, as compared to the straight slab portions, the ladder shaped first slab portion 520 and the ladder shaped second slab portion 550 are able to reduce the transmission loss by up to 14%, to reduce the slab resistance by approximately 35%, and to improve the bandwidth by approximately 49%. Furthermore, since a PIN junction/structure is formed in the optical coupling region OR, the power consumption in the optical modulator 500d may be lowered and the optical modulator 500d may be utilized in ultra-low power applications.

Figure 9:
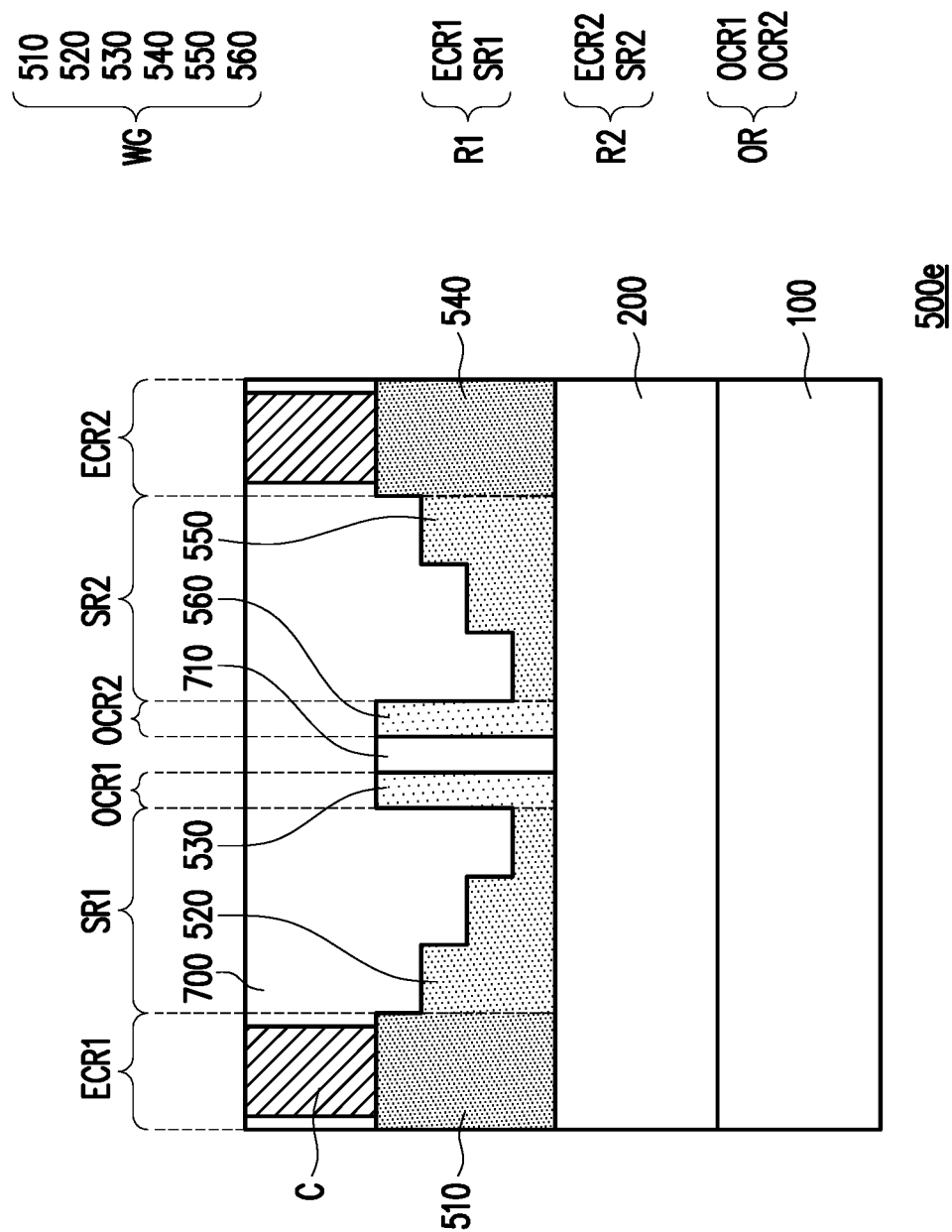
FIG. 9 is a schematic cross-sectional view illustrating an optical modulator in accordance with some alternative embodiments of the disclosure.

FIG. 9 is a schematic cross-sectional view illustrating an optical modulator 500e in accordance with some alternative embodiments of the disclosure. Referring to FIG. 9, the optical modulator 500e in FIG. 9 is similar to the optical modulator 500 in FIG. 3D, so similar elements are denoted by the same reference numeral and the detailed descriptions thereof are omitted herein. The difference between the optical modulator 500e in FIG. 9 and the optical modulator 500 in FIG. 3D lies in that the optical modulator 500e further includes an insulator 710 sandwiched between the first optical coupling portion 530 and the second optical coupling portion 560. In other words, at least a portion of the first coupling portion 530 and the second optical coupling portion 560 are separated by the insulator 710. In some embodiments, a material of the insulator 710 may be similar to the material of the dielectric layer 200 and the insulating layer 700. For example, the material of the insulator 710 may include silicon oxide, silicon nitride, titanium oxide, or the like.

In some embodiments, since the optical signal is transmitted close to/in the first optical coupling portion 530 and the second optical coupling portion 560, the lightly doped portions (the first optical coupling portion 530 and the second optical coupling portion 560) are able to maintain sufficient optical signal transmission. In other words, the optical loss is minimized. On the other hand, since the electrical signal is transmitted to the first electrical coupling portion 510 and the second electrical coupling portion 540, the heavily doped portions (the first electrical coupling portion 510 and the second electrical coupling portion 540) are able to increase depletion region variation under different voltage bias, thereby providing larger effective refractive index change ($\Delta$ Neff). Moreover, the ladder shaped first slab portion 520 and the ladder shaped second slab portion 550 provide sufficient thickness to reduce sheet resistance, thereby minimizing the RC delay. As such, a desired bandwidth may be effectively obtained. For example, as compared to the straight slab portions, the ladder shaped first slab portion 520 and the ladder shaped second slab portion 550 are able to reduce the transmission loss by up to 14%, to reduce the slab resistance by approximately 35%, and to improve the bandwidth by approximately 49%.

Figure 10:
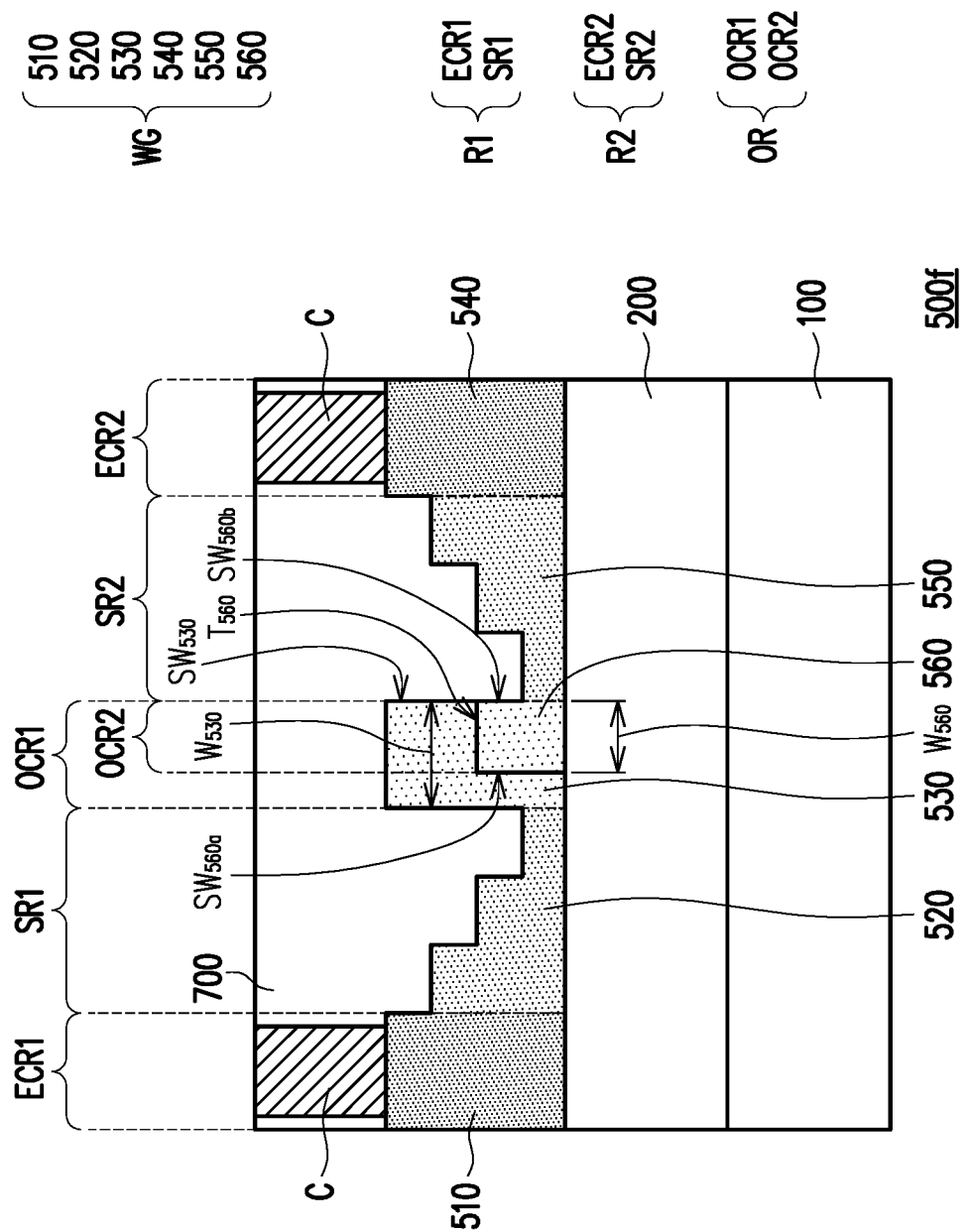
FIG. 10 is a schematic cross-sectional view illustrating an optical modulator in accordance with some alternative embodiments of the disclosure.

FIG. 10 is a schematic cross-sectional view illustrating an optical modulator 500f in accordance with some alternative embodiments of the disclosure. Referring to FIG. 10, the optical modulator 500f in FIG. 10 is similar to the optical modulator 500 in FIG. 3D, so similar elements are denoted by the same reference numeral and the detailed descriptions thereof are omitted herein. The difference between the optical modulator 500f in FIG. 10 and the optical modulator 500 in FIG. 3D lies in that the first optical coupling region OCR1 overlaps with the second optical coupling region OCR2. As illustrated in FIG. 10, the second optical coupling portion 560 is located underneath the first optical coupling portion 530. In some embodiments, the first optical coupling portion 530 covers a top surface $T_{560}$ and a first sidewall $SW_{560a}$ of the second optical coupling portion 560. On the other hand, a portion of a second sidewall $SW_{560b}$ is covered by the insulating layer 700 while another portion of the second sidewall $SW_{560b}$ is covered by the second slab portion 550. In some embodiments, a sidewall $SW_{530}$ of the first optical coupling portion 530 is coplanar with the second sidewall $SW_{560b}$ of the second optical coupling portion 560. In some embodiments, a width $W_{530}$ of the first optical coupling portion 530 is greater than a width $W_{560}$ of the second optical coupling portion 560.

In some embodiments, since the optical signal is transmitted close to/in the first optical coupling portion 530 and the second optical coupling portion 560, the lightly doped portions (the first optical coupling portion 530 and the second optical coupling portion 560) are able to maintain sufficient optical signal transmission. In other words, the optical loss is minimized. On the other hand, since the electrical signal is transmitted to the first electrical coupling portion 510 and the second electrical coupling portion 540, the heavily doped portions (the first electrical coupling portion 510 and the second electrical coupling portion 540) are able to increase depletion region variation under different voltage bias, thereby providing larger effective refractive index change ($\Delta$ Neff). Moreover, the ladder shaped first slab portion 520 and the ladder shaped second slab portion 550 provide sufficient thickness to reduce sheet resistance, thereby minimizing the RC delay. As such, a desired bandwidth may be effectively obtained. For example, as compared to the straight slab portions, the ladder shaped first slab portion 520 and the ladder shaped second slab portion 550 are able to reduce the transmission loss by up to 14%, to reduce the slab resistance by approximately 35%, and to improve the bandwidth by approximately 49%.

In some embodiments, the ladder shaped first slab portion 520 and the ladder shaped second slab portion 550 may be utilized in various modulators, such as a Mach-Zehnder Modulator (MZM) or a Ring Modulator (RM). In some embodiments, the MZM includes a phase shifter implemented in a doped waveguide, a Mach-Zehnder interferometer (MZI), and a multi-mode interferometer (MMI). The ladder shaped first slab portion 520 and the ladder shaped second slab portion 550 may be incorporated into the doped waveguide of the MZM to improve the bandwidth of the modulator. In some embodiments, the RM includes a ring and a waveguide implemented in a doped waveguide. The ladder shaped first slab portion 520 and the ladder shaped second slab portion 550 may be incorporated into the doped waveguide of the RM to improve the bandwidth of the modulator.

In accordance with some embodiments of the disclosure, an optical modulator includes a dielectric layer and a waveguide. The waveguide is disposed on the dielectric layer. The waveguide has a first region, a second region, and an optical coupling region between the first region and the second region. The waveguide located in the first region includes a first electrical coupling portion and a first slab portion connected to each other. The waveguide located in the second region includes a second electrical coupling portion and a second slab portion connected to each other. The waveguide located in the optical coupling region includes a first optical coupling portion and a second optical coupling portion. The first slab portion has at least two sub-portions having different heights. The second slab portion has at least two sub-portions having different heights.

In accordance with some alternative embodiments of the disclosure, an optical modulator includes a waveguide. The waveguide has a first region, a second region, and an optical coupling region between the first region and the second region. The waveguide located in the first region includes a first electrical coupling portion and a first slab portion connected to each other. The waveguide located in the second region includes a second electrical coupling portion and a second slab portion connected to each other. The waveguide located in the optical coupling region includes a first optical coupling portion connected to the first slab portion and a second optical coupling portion connected to the second slab portion. An interfacial area between the first electrical coupling portion and the first slab portion is larger than an interfacial area between the first slab portion and the first optical coupling portion. An interfacial area between the second electrical coupling portion and the second slab portion is larger than an interfacial area between the second slab portion and the second optical coupling portion.

In accordance with some embodiments of the disclosure, a package includes a processor, an optical modulator, and a driver. The optical modulator includes a dielectric layer and a waveguide. The waveguide is disposed on the dielectric layer. The waveguide has a first region, a second region, and an optical coupling region between the first region and the second region. The waveguide located in the first region includes a first electrical coupling portion and a first slab portion connected to each other. The waveguide located in the second region includes a second electrical coupling portion and a second slab portion connected to each other. The waveguide located in the optical coupling region includes a first optical coupling portion and a second optical coupling portion. The first slab portion and the second slab portion are respectively ladder shaped. The driver is configured to drive the optical modulator and is electrically connected to the processor.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An optical modulator, comprising:
    a dielectric layer;
    a waveguide disposed on the dielectric layer, wherein the waveguide comprises an electrical coupling portion, a slab portion, and an optical coupling portion, the slab portion is sandwiched between the electrical coupling portion and the optical coupling portion, the slab portion is directly in contact with the electrical coupling portion, the slab portion has at least two sub-portions having different heights, and a maximum height of the slab portion is smaller than a height of the electrical coupling portion.

2. The optical modulator according to claim 1, further comprising:
    a substrate, wherein the dielectric layer and the waveguide are stacked on the substrate;
    a conductive connector disposed on the electrical coupling portion of the waveguide; and
    an insulating layer covering the waveguide and the conductive connector.

3. The optical modulator according to claim 1, wherein a doping concentration of the electrical coupling portion is greater than a doping concentration of the slab portion, and the doping concentration of the slab portion is greater than a doping concentration of the optical coupling portion.

4. The optical modulator according to claim 1, wherein the slab portion comprises a first sub-portion connected to the electrical coupling portion, a second sub-portion connected to the first sub-portion, and a third sub-portion connected to the second sub-portion, a doping concentration of the electrical coupling portion is greater than a doping concentration of the first sub-portion, the doping concentration of the first sub-portion is greater than a doping concentration of the second sub-portion, the doping concentration of the second sub-portion is greater than a doping concentration of the third sub-portion, and the doping concentration of the third sub-portion is greater than a doping concentration of the optical coupling portion.

5. The optical modulator according to claim 1, wherein the slab portion comprises a first sub-portion connected to the electrical coupling portion and a second sub-portion connected to the first sub-portion, and a height of the first sub-portion is greater than a height of the second sub-portion.

6. The optical modulator according to claim 5, wherein the slab portion further comprises a third sub-portion connected to the second sub-portion, and a height of the second sub-portion is greater than a height of the third sub-portion.

7. The optical modulator according to claim 1, wherein the height of the electrical coupling portion is equal to a height of the optical coupling portion.

8. The optical modulator according to claim 1, wherein the waveguide further comprises an intrinsic semiconductor portion connected to the optical coupling portion, and the optical coupling portion is sandwiched between the slab portion and the intrinsic semiconductor portion.

9. The optical modulator according to claim 8, wherein a height of the intrinsic semiconductor portion is less than a height of the optical coupling portion.

10. The optical modulator according to claim 1, further comprising an insulator, wherein the optical coupling portion is sandwiched between the slab portion and the insulator.

11. An optical modulator, comprising:
a waveguide, wherein the waveguide comprises a first portion and a second portion next to the first portion, the first portion comprises a first electrical coupling portion, a first slab portion connected to the first electrical coupling portion, and a first optical portion connected to the first slab portion, the second portion comprises a second electrical coupling portion, a second slab portion connected to the second electrical coupling portion, and a second optical coupling portion connected to the second slab portion, an interfacial area between the first electrical coupling portion and the first slab portion is larger than an interfacial area between the first slab portion and the first optical coupling portion, and a maximum height of the first slab portion is smaller than a height of the first electrical coupling portion.

12. The optical modulator according to claim 11, wherein a doping concentration of the first electrical coupling portion is greater than a doping concentration of the first slab portion, and the doping concentration of the first slab portion is greater than a doping concentration of the first optical coupling portion.

13. The optical modulator according to claim 12, wherein a doping concentration of the second electrical coupling portion is greater than a doping concentration of the second slab portion, and the doping concentration of the second slab portion is greater than a doping concentration of the second optical coupling portion.

14. The optical modulator according to claim 11, wherein the waveguide further comprises a third portion sandwiched between the first portion and the second portion, and the third portion comprises an intrinsic semiconductor portion sandwiched between the first optical coupling portion and the second optical coupling portion.

15. The optical modulator according to claim 11, further comprising an insulator sandwiched between the first portion and the second portion of the waveguide.

16. The optical modulator according to claim 11, wherein a width of the first optical coupling portion is greater than a width of the second optical coupling portion.

17. The optical modulator according to claim 11, wherein the first optical coupling portion covers a top surface and a sidewall of the second optical coupling portion.

18. A package, comprising:
a processor;
an optical modulator, comprising:
    a dielectric layer; and
    a waveguide disposed on the dielectric layer, wherein the waveguide comprises an electrical coupling portion, a slab portion, and an optical coupling portion, the slab portion is sandwiched between the electrical coupling portion and the optical coupling portion, and the slab portion is ladder shaped; and
a driver configured to drive the optical modulator, wherein the driver is electrically connected to the processor.

19. The package according to claim 18, wherein a doping concentration of the electrical coupling portion is greater than a doping concentration of the slab portion, and the doping concentration of the slab portion is greater than a doping concentration of the optical coupling portion.

20. The package according to claim 18, wherein a maximum height of the slab portion is smaller than a height of the electrical coupling portion.

* * * * *